May 15, 1951
S. D. LESESNE
2,553,198
METHOD OF AND APPARATUS FOR THE
PRODUCTION OF BORON HYDRIDES
Filed Feb. 3, 1945
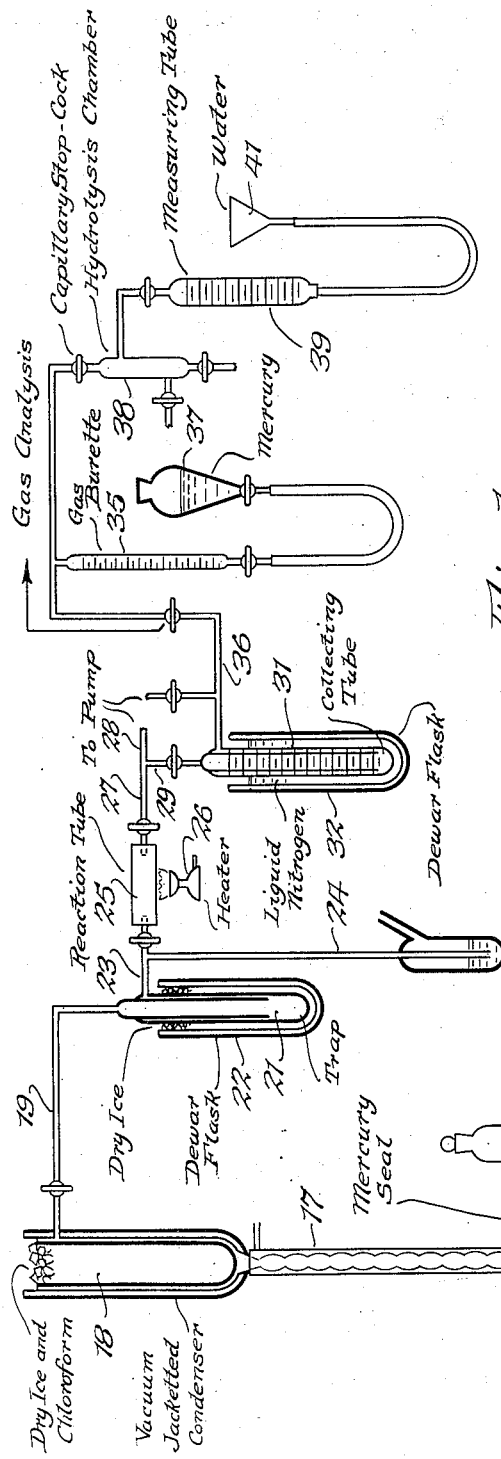
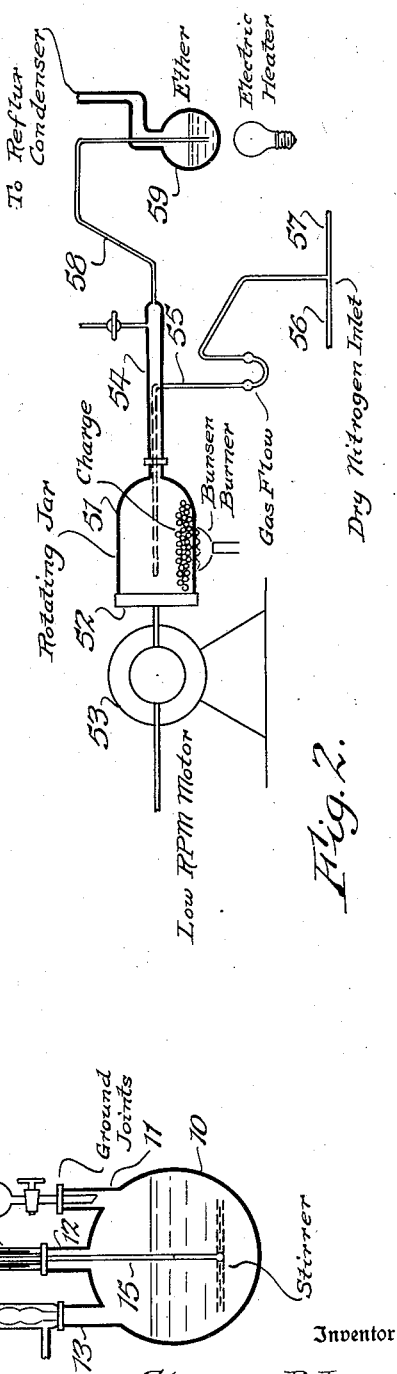
Inventor
Sherman D. Lesesne
By
Albert R. Henry
Attorney Patented May 15, 1951

2,553,198

UNITED STATES PATENT OFFICE 2,553,198

METHOD OF AND APPARATUS FOR THE PRODUCTION OF BORON HYDRIDES

Sherman D. Lesesne, Worcester, Mass., assignor, by mesne assignments, to Allied Process Corporation, New York, N. Y., a corporation of New York Application February 3, 1945, Serial No. 576,130

2 Claims. (Cl. 23—204)

This invention relates to a method of and apparatus for the production of compounds of boron and hydrogen, and it has particular reference to the production, in substantial quantities, of the simplest of such compounds—diborane.

The group of compounds broadly encompassed by the term "boron hydrides" comprises a number whose molecule is composed of atoms of boron and hydrogen, together with various addition products or derivatives thereof. They have heretofore been primarily of theoretical interest, and have been prepared only with great difficulty. The literature of the subject is nicely summarized in two publications, to which, with their bibliographies, the reader is referred for a survey of the art as it has heretofore existed. These are: (1) "Hydrides of boron and silicon," by Alfred Stock, Cornell University Press, 1933, and (2) "Recent developments in the chemistry of the boron hydrides," by H. I. Schlesinger and Anton B. Burg, 31 Chemical Reviews 1, August 1942.

Without attempting here to abstract the literature, it may be noted that there are known two general types of substances having a boron-hydrogen molecule, respectively called the "boranes" and the "hydroboranes." To them are respectively ascribed empirical formulae such as $B_nH_{(n+4)}$, and $B_nH_{(n+6)}$, the boranes being relatively more stable. There also appear to be other compounds having a different boron-hydrogen ratio, and which have not as yet been fully identified. Of the boranes, the first of the series is diborane, $B_2H_6$, which is a colorless gas at ordinary conditions of temperature and pressure, but which may be solidified at about $-165.5°$ C., and which has a boiling point of $-92.5°$ C. By suitable treatment, diborane may be converted into other boron-hydrogen compounds or derivatives, and it thus may be regarded as a basic material for purposes of synthesis.

Due to the richness of diborane in hydrogen, it is moreover a useful source of elemental hydrogen, of especial value when it is desired to condense the available hydrogen content into a smaller space than would be occupied by an equivalent content of hydrogen itself. Thus, when diborane is hydrolyzed by water and acid, six volumes of hydrogen are liberated according to the following equation:

$$B_2H_6+6H_2O=6H_2+2H_3BO_3 \qquad (1)$$

Heretofore, however, no method or means has been available, despite the intensity of scientific study, to provide the boron hydrides in quantities of more than a few grams at a time. Stock's synthesis was predicated on the decomposition of magnesium boride with an aqueous acid solution, which precluded the direct formation of diborane due to the hydrolytic effect just noted, but which yielded small quantities of crude gas which had to be further processed. In first describing an improved method, Schlesinger and Burg reported that with the Stock method, "a month of tedious work is required for the production of a few grams of a mixture of several hydrides." (53 JACS 4321 (1931) "Hydrides of Boron. I. An Efficient New Method of Preparing Diborane.") These later investigators devised a method of treating a suitable substance, such as gaseous boron trichloride or boron bromide, with hydrogen in the electric arc at low pressure. They reported that their method produced a small amount of diborane directly, together with halogenated diborane which could be further treated to yield additional quantities of diborane; and that thereby they could produce from five to ten grams per week.

By contrast with the results heretofore obtained, the present invention enables one to produce diborane in pure form, and quantitatively, in amounts limited only by the raw materials and equipment available. The present invention thus permits the industrial preparation of diborane, and other boron-hydrogen compounds, for the first time.

The present invention involves a reaction between a salt-like or saline hydride of a metal and a boron halide, of which the following is a typical equation:

$$6LiH+2BF_3=B_2H_6+6LiF \qquad (2)$$

I have discovered that a compound such as lithium hydride, particularly when pulverized to have a large available surface area, and a compound such as boron fluoride, will react under suitable conditions either in a dry way, or in the presence of a non-aqueous suspending or dispersing liquid, in accordance with the foregoing equation. When a liquid is used, it should not, if good efficiencies are to be expected, be destructively reactive with either the hydride or the halide, or the desired end product, nor should such liquid otherwise inhibit the desired reaction. Examples of suitable liquids will be given hereinafter.

The class of substances denominated the salt-like or saline hydrides are succinctly described in Ephraim, "Inorganic Chemistry," (Thorne & Roberts 4th edition, pp. 877, 878, Nordeman Publishing Co., New York) as comprising hydrides of the alkalis and the alkaline earths, with certain exceptions. In them, according to theory, the hydrogen acts as a negative ion, rather than as a positive ion as is generally considered in many reactions. Of the various hydrides and halides which have been available for study in connection with the present invention, the lithium hydride and boron fluoride combination has been found to be most effective, and accordingly such combination is regarded as the best now known for the efficient practice of the invention.

This conclusion is based on the following observations, which also show the reactivity of other hydrides and halides. When boron fluoride is replaced with boron bromide, some hydrobromic acid is also formed, thus detracting from the efficiency, and also contaminating the diborane. When calcium hydride and boron fluoride are used, the yield of diborane is positive, but the reaction proceeds much more slowly, and does not appear to go to completion. When lithium hydride and boron chloride are used, diborane is formed, but only in small amounts under the same conditions which enable specific reaction (2) to go to completion. When sodium hydride is treated with boron chloride, a reaction takes place, with the formation of boron-hydrogen molecules that appear to have a formula other than $B_2H_6$. Under the same conditions of temperature and pressure, however, lithium hydride and boron fluoride may be made to react with much higher yields, and accordingly these two substances may be regarded as most efficacious.

In conducting the process in either a wet or a dry way, the hydride should be pulverized, as by grinding until all the particles pass an eighty mesh sieve. When grinding, moisture or atmospheric air should be excluded as much as possible, because the hydride may otherwise decompose with the formation of hydroxides or carbonates, and thus detract from the overall reaction efficiency. The hydride powder may then be contacted with the boron halide, and, under suitable temperature conditions, the boron-hydrogen compounds will then be formed.

In one way of carrying out the process, there was set up the customary combustion tube apparatus, such as is used for the determination of carbon in steel. Into the boat was placed some powdered lithium hydride, and, after the tube was swept free of air by a stream of nitrogen, gaseous boron halide (i. e., fluoride or bromide) was passed over the hydride while heating the boat with Bunsen burners. The products of the reaction included diborane, diluted with unreacted halide, and also white cruciform crystals, of good stability, which were deposited in the cold portion of the discharge tube. Since it is known that diborane may be decomposed by heat to yield other boron hydrides, the presence of such crystals may be accounted for on this basis. While such procedure illustrates one way of conducting the reaction, better results are obtainable by using other types of apparatus and somewhat different technique, as hereinafter described.

In conducting the reaction in the wet way, the powdered hydride may be suspended in a suitable liquid such, for example, as an ester (ethyl acetate), a ketone, or an ether. The boron halide, either in gaseous form or dissolved in the liquid, may then be led into the suspension to contact the hydride and so promote the reaction. As the reaction is exothermic, the evolved heat may be employed to distill the diborane from the reaction zone, and, by placing a reflux condenser in the discharge line, the liquid may be retained, while the relatively pure diborane passes forward to a point of collection. Various advantages of this procedure will be made more apparent as this description proceeds.

A further discussion of the principles of the invention, and the various features thereof, will be made with reference to the accompanying drawings showing suitable apparatus and wherein:

Fig. 1 is an elevation of equipment suitable for conducting the process in the wet way; and Fig. 2 is an elevation of part of the apparatus which may be used in conducting the process in a dry way.

In Fig. 1, a reaction flask 10 is provided with three necks, 11, 12, and 13, respectively receiving a dropping tube 14, a stirrer 15 protected by a mercury seal 16, and the lower end of a reflux condenser 17. One of the reagents, for example the powdered hydride, is placed with some liquid in the flask 10 and is maintained in a suspended or dispersed condition by the stirrer 15. The other reagent, such, for example, as the boron halide, is then admitted at a suitable rate from the dropping tube 14. Volatile reaction products pass into the water-cooled condenser, which is of the low temperature type. That is, its upper end is enlarged to receive a thimble 18 containing a mixture of solid carbon dioxide or "dry ice" and chloroform, so that high boiling point substances (as compared to the diborane) are condensed for return to the flask 10.

A discharge line 19 communicates with the upper end of the thimble 18, and it leads to a liquid trap 21 maintained at a temperature close to $-78°$ C. by a surrounding flask 22 packed with Dry Ice. To safeguard against the possibility that desired material will pass the reflux condenser 17, this trap is useful to separate ingredients condensing above the trap temperature. In the hereinafter described examples, the amount of condensate in the trap 21 was found to be quite limited.

The gas not condensed in the trap 21 passes through a branch line 23, to which is connected a manometer 24 for determining pressures, and a reaction tube 25 which may be heated as by the Bunsen burner 26. It has already been noted that the wet method may be operated to produce high yields of diborane, which may, if desired, be decomposed by heat into other boron hydrides. The reaction tube 25 therefore illustrates a way in which the end product may be modified from the products initially formed in the flask 10, although for many purposes this part of the apparatus will not be needed. In such event, no heat is supplied to the tube 25, which then is simply a portion of the conduit through which the diborane passes. The reaction tube 25 communicates with a line 27 having a branch 28 connected to a vacuum pump (not shown), so that the whole system may be exhausted as desired, and a branch 29 connected to a collecting tube 31 which is cooled by a flask 32 containing liquid nitrogen. Such cooling medium produces a temperature of about $-196°$ C., and therefore effects the solidification of diborane.

The remaining parts of the apparatus will be recognized as simple equipment for conducting tests and analyses. There is provided the gas burette 35, connected to the collecting tube 31 by a line 36, and whose volume may be regulated by mercury contained in the attached separatory funnel 37, together with a hydroylsis chamber 38, measuring tube 39, and water admission funnel 41. As these devices relate to analytical methods employed to determine the efficiency of the invention, and as their nature is apparent to those skilled in the art, it is not believed a further description is required. The drawing discloses how they may be associated with the previously described parts of the apparatus. It will likewise be obvious that the various stopcocks illustrated may be operated as conditions require, and that the reaction flasks, condensers, and other parts may be duplicated to increase the capacity. Chemical glass may be used in preparing this equipment, with the stopcocks well fitted. It may be of interest to report that while this apparatus is quite simple, and of ordinary laboratory type, good results have been obtained with it and without the difficulties explained by Professor Stock (loc. cit. p. 173).

In Fig. 2, the reaction flask 10 has been replaced by a structure which essentially is a ball mill. A glass jar 51 of about one liter capacity is secured to a chuck 52 which is driven for rotation at about 60 R. P. M. through a small motor and speed reduction gear set 53. The mouth of the jar is ground to receive a non-rotating glass tube 54 provided with a smaller inner tube 55 leading to the back of the jar, and connected at its outer end to a line 56 and a second line 57. It may be noted here that the line 56 is used to sweep out the apparatus with a current of dry nitrogen before instituting the reactions, the presence of oxygen or moisture obviously being detrimental. Products of the reaction pass through the mouth of the jar through the large tube 54 into a line 58, and thence into a flask containing a liquid such as ether, and which in turn is connected to the reflux condenser 17 and the other apparatus as heretofore described.

In operation, the jar 51 is charged with flint balls of about two to three centimeters in diameter, and some finely divided hydride. Heat is supplied through a Bunsen burner positioned below the jar, and the boron halide is led in through the line 57. As the jar rotates, the balls break up the powder and prevent the formation of solid masses, and thus present fresh surfaces of the hydride to the entering halide. In the work in which this equipment was used, solid boron hydrides were detected in the relatively cold stretches of the large tube 54 and the line 58, while the interposed flask 59 of ether provided a means for trapping or dissolving substantial quantities of unconverted boron halide. By providing the usual electric light bulb, the remaining boron hydrides are easily distilled into the reflux condenser for further separation and collection.

In one run with the apparatus shown in Fig. 2, the jar 51 was charged with a quantity of lithium hydride which had been ground to pass an eighty mesh screen. The apparatus was then swept out with nitrogen from the line 56, and gaseous boron fluoride was thereafter admitted through the line 57. The reaction initially proceeded at a slow rate, but much more rapidly as the jar 51 was heated to a temperature between 150° and 250° C. The rotation of the jar and the action of the flint balls on the particles of hydride served to break up the mass and to present fresh surfaces to the action of the gas, thus enabling the reaction to proceed. While such reaction is exothermic, the radiation losses from the simple equipment employed were such that some make-up heat was required during the run.

The gases flowing through the discharge tube 54 were bubbled through boiling anhydrous ethyl ether in the flask 59, wherein a substantial portion of the unconverted boron fluoride was dissolved. The distillate from the flask was then passed through the reflux condenser 17, to return the ether and other materials condensing below the temperature of the thimble 18, and to forward the residue to the collecting tube 31. With intermittent operation, 16.5 grams of impure diborane were obtained after two days. The final condensate contained some $BF_3$, which may have come over as $B_2H_5F$ and subsequently decomposed, and 60% diborane, as determined by the hydrolysis reaction. By fractional condensation, the purity was successively increased to 77%, 91%, and 95%.

It will be apparent, from this example, that the invention provides for the production of diborane in much greater quantities, and with yields of higher initial purity, than attainable heretofore. The reaction may be conducted either intermittently or continuously, and it will be obvious that even better results may be obtained according to the dry procedure by suitable refinements in the apparatus.

Referring again to Fig. 1, the following example will illustrate how the invention may be practiced in the wet way. The flask 10 was charged with 1600 cc. of anhydrous ethyl ether and 116.7 grams of pulverized lithium hydride having an LiH content of 77%. The amount of available lithium hydride was therefore equivalent to 89.9 grams. The particles were dispersed through the ether by means of the stirrer 15. The dropping tube 14 was charged with a saturated solution of boron fluoride in ether, which was prepared by bubbling the gas into the ether at approximately 0° C. until absorption ceased, and thereafter fractionating between 123° C. and 126° C. The liquid so obtained is an addition compound of ether and boron fluoride, as represented by the formula $(C_2H_5)_2O:BF_3$, and which, under the conditions of operation, is so unstable as to release the halide readily in the reaction zone. The contents of the tube 14 were moreover saturated with diborane prepared from a previous operation of the process.

Upon opening the stopcock of the dropping tube 14, the reaction proceeded at room temperature, increasing somewhat in rate and liberating enough heat to cause the liquid to boil evenly and thus distill the reaction products into the reflux condenser 17. This uniformity of reaction may be attributed in part to the mass of the ether present, and to the dissipation of the heat through the condenser, thus maintaining a substantially constant reaction temperature. Very little liquid or boron fluoride passed the cold thimble 18, and this small amount was caught by the trap 21, thus permitting pure gas to go forward to the collecting tube 31 for condensation by liquid nitrogen in the container 32.

At the end of the reaction, which was within twenty-four hours from the time of starting, there was recovered 47.2 grams of pure diborane, $B_2H_6$, or 90.2% of the theoretical maximum yield. The difference is accounted for by losses in the apparatus and through the mercury seal 16, thus indicating that the reaction had proceeded quantitatively to completion. The end product showed, upon analysis, no trace of fluoride compounds, and purities of 99.5% and 99.8% respectively by the hydrolysis test. Repetitions of the foregoing operation confirmed the end product to be pure diborane. It will thus be seen that, for the first time, the present invention provides a means of preparing diborane directly in a pure state, and in quantities greatly in excess of those heretofore obtainable.

With respect to the foregoing example, it may be pointed out that the employment of ethyl ether has a number of practical advantages, although, as previously noted, other liquids may be used. The ether does not enter the reaction by undergoing chemical decomposition, in fact, it has a high degree of stability under the described conditions of operation. Its relatively low boiling point (about 35° C.) permits the rapid removal of the gaseous boron hydrides at a low temperature, while the comparatively high boiling point of the ether-boron fluoride complex (about 126° C.) tends to keep any unreacted halide from passing the reflux condenser. As previously explained, ether is a solvent for the boron halide, forming a solution or addition compound which is unstable in the reaction zone, but it is not a good solvent, at its boiling temperature, for the diborane. These attributes simplify the conduct of the reaction, enabling it to proceed uniformly, in simple apparatus, and with normal external conditions of atmospheric temperature and pressure. The separation of the diborane from the reactants in situ, as described in connection with the action in the condenser 17, moreover leads to the direct recovery of a pure end product.

The addition of some diborane to the reaction chamber, as by introducing it through the dropping tube 14 or directly into the flask 10 at the time of starting the reaction, acts as a promoter, enabling the reaction to start more readily and to reach its optimum rate in a shorter period of time. Its inclusion is not, however, essential to the invention in its broader aspects.

It will moreover be apparent that the procedure just outlined may be modified in various ways. Thus, a slurry of the hydride in a suitable carrier liquid may be formed outside of the reaction vessel, and supplied to it concurrently with or after the introduction of gaseous or dissolved boron halide. For continuous operation, the lithium fluoride formed as a reaction product may also be withdrawn from time to time, so as to make way for fresh quantities of the reactants. The liberated diborane may be collected as described in a solid state, or it may be collected as a gas or taken to some other collection point for conversion to some other product.

From the foregoing description, it will be seen that the present invention provides a novel and effective means for the production of the boron hydrides in large quantities, with simple apparatus, and with yields and efficiencies greatly exceeding those heretofore attainable. In view of the high efficiency obtainable with the wet process, it would appear that this way of conducting the invention represents the procedure now best known. It has, however, been made clear that the invention may be practiced in various ways, and it is of course recognized that the problems of industrial and engineering chemistry may often dictate a sacrifice of efficiency, as such, to achieve some other purpose. Hence, it is not intended to limit the invention to any specific example given, but to encompass all such variations and modifications as fall within the scope of the following claims.

I claim:

1. In the preparation of diborane, the steps which comprise bringing together finely divided lithium hydride and boron fluoride in the presence of non-aqueous liquid, and adding thereto some diborane to expedite the reaction.

2. The method of preparing diborane which comprises continuously contacting a suspension of powdered alkali metal hydride in an inert liquid containing added diborane with boron trifluoride and condensing the diborane produced.

SHERMAN D. LESESNE.

No references cited.